Figure 10:
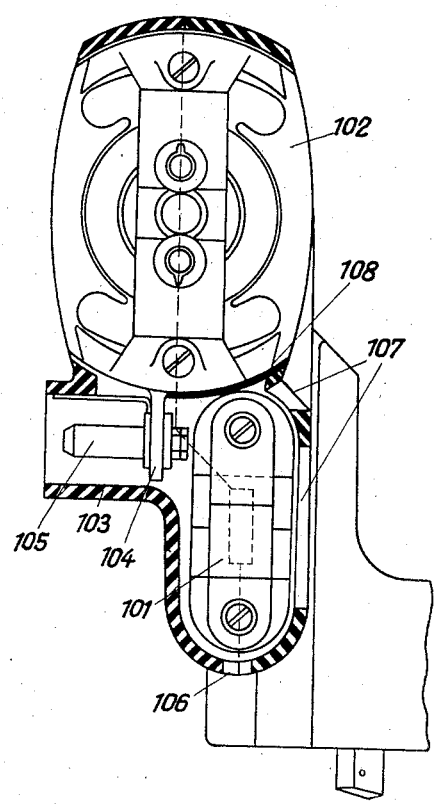

June 12, 1934.　　M. SCHWAB ET AL　　1,962,880
ELECTRIC DRIVE FOR HOUSEHOLD SEWING MACHINES
Filed June 20, 1932　　4 Sheets-Sheet 1
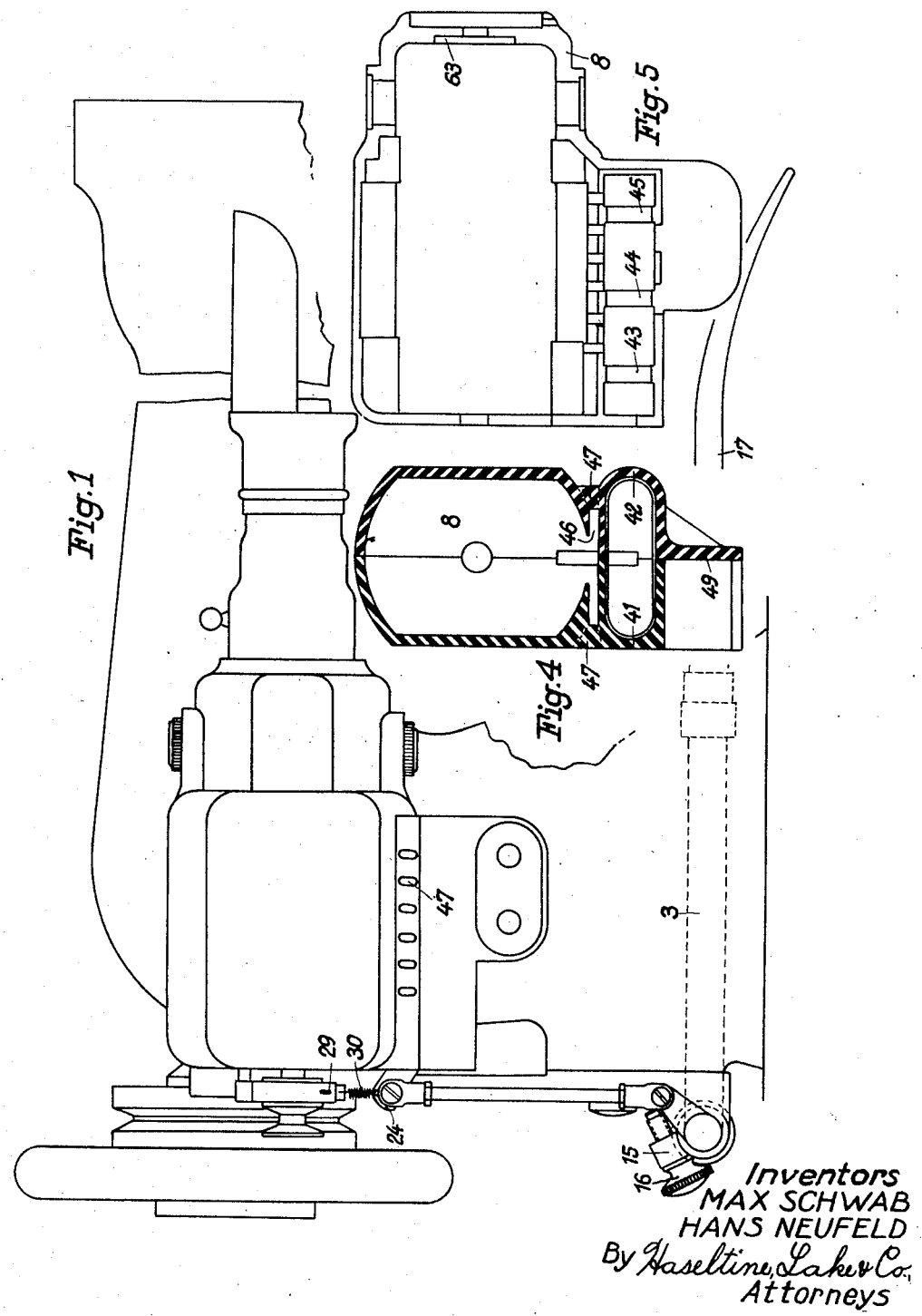
Inventors
MAX SCHWAB
HANS NEUFELD
By Haseltine, Lake & Co.
Attorneys

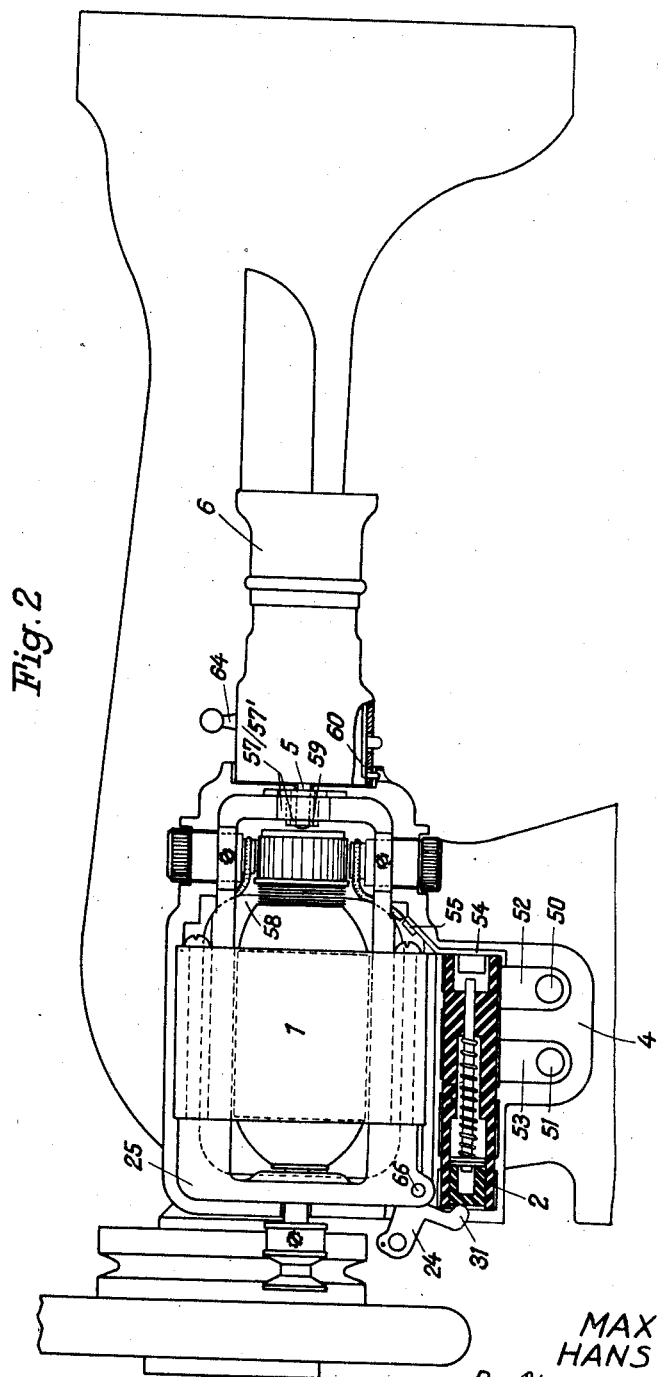

June 12, 1934.  M. SCHWAB ET AL  1,962,880
ELECTRIC DRIVE FOR HOUSEHOLD SEWING MACHINES
Filed June 20, 1932  4 Sheets-Sheet 3
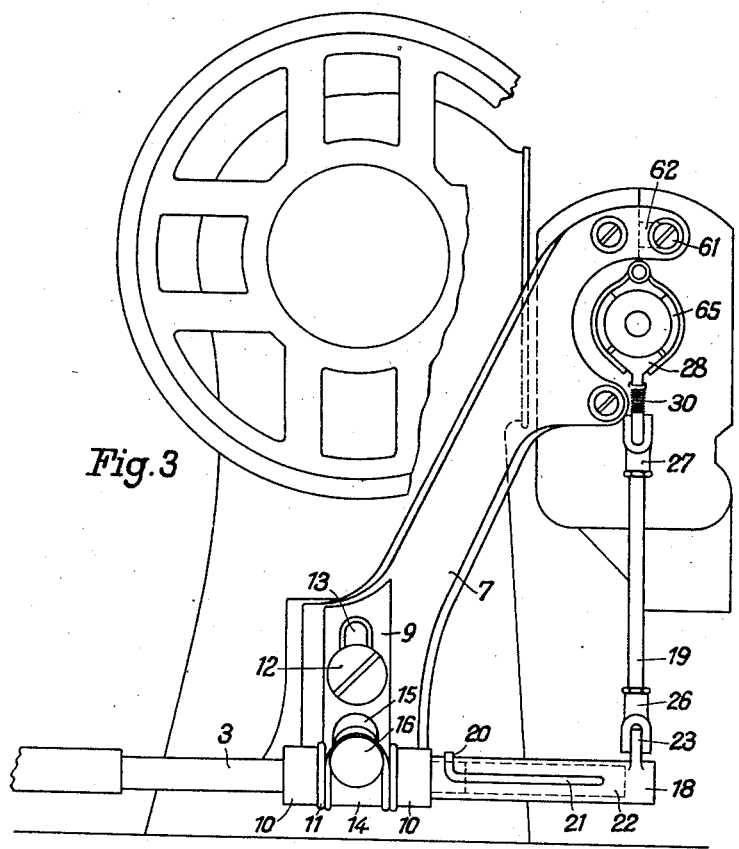
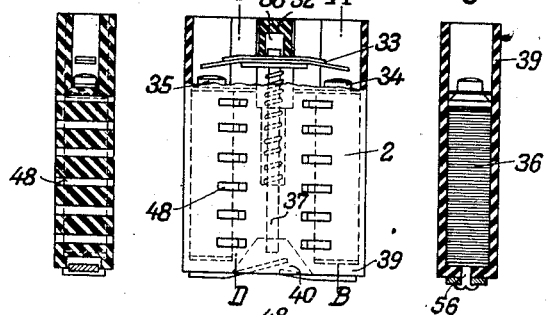
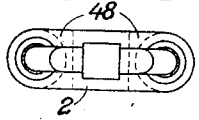
Inventors
MAX SCHWAB
HANS NEUFELD
By Haseltine, Lake & Co.
Attorneys June 12, 1934.  M. SCHWAB ET AL  1,962,880
ELECTRIC DRIVE FOR HOUSEHOLD SEWING MACHINES
Filed June 20, 1932    4 Sheets-Sheet 4

Inventors
MAX SCHWAB
HANS NEUFELD
By Haseltine Lake & Co.,
Attorneys

Patented June 12, 1934

1,962,880

UNITED STATES PATENT OFFICE 1,962,880

ELECTRIC DRIVE FOR HOUSEHOLD SEWING MACHINES

Max Schwab, Mannheim, and Hans Neufeld, Kaiserlautern, Germany

Application June 20, 1932, Serial No. 618,268
In Germany June 20, 1931

11 Claims. (Cl. 172—36)

The invention relates to an electrical drive for household sewing machines and consists in that the electromotor, the regulating starter, the apparatus plug for leading in the current and plug socket for the sewing light are housed in a common casing. The casing is preferably made of insulating material.

This combination of all the parts of the electric drive and of the illumination of household sewing machines into a single unit proves to be, in comparison with what is known, an arrangement with a simpler and more supervisable construction having a greater degree of certainty of operation and of contact. This completeness is not to be met with in the case of any of the known drives. In the case of the latter only one or other component of the drive is at times built on the motor or combined with it to form a common whole—e. g., motor and apparatus plug or motor and plug socket for the sewing light.

It has also already been proposed to combine the motor and carbon pressure regulating starter into a common whole. The other parts are arranged separately from these; this makes the drives troublesome and expensive.

In the case of the subject matter of the invention, the whole aggregate, which comprises the electrical accessories of the drive, is arranged in an insulating casing that is in two parts, so that, after taking away the front half of the casing, the whole apparatus together with the electrical connections can be conveniently inspected. The casing is of very small dimensions; this has been rendered possible especially by the employment of a built-in motor as well as by a regulating starter with carbon pressure contacts.

A further feature of the subject matter of the invention is the arrangement of the plug socket for the sewing light so as to be co-axial with the axis of the motor. The plug bushes are mounted in the frame of the motor and the wall of the casing serves as a protection against contact.

The casing with the apparatus is fixed in the known manner by means of a carrying arm on the upper portion of the machine—i. e., on the screwing-on pedestal usually provided for fitting the hand-rotating apparatus. On the carrying arm is mounted the operating member for the regulating starter and the quick-action brake.

According to the invention, it is further proposed to arrange the regulating starter in the insulating casing so that it faces the motor with one of its narrow sides. With this position of the starter there is rendered possible an abundant supply of fresh air which washes the resistance body on all sides and, as warmed air, escapes through the exit openings provided above the starter in the casing, without coming into contact with the motor.

In order further to prevent an excessive heating of the motor, there is provided on the bottom of the motor a reflecting coating which turns the heat of the starter into the direction of the openings in the casing. Finally, a built-in small fan may also be provided for carrying away the heat.

An example of the subject matter of the invention in combination with a household sewing machine is represented in the drawings, of which Figure 1 is an elevation of the complete drive fitted on a sewing machine, Figure 2 shows the drive with the front half of the casing removed and a section through the regulating starter, Figure 3 shows a side view of the complete drive, Figure 4 is a cross-section through the insulating casing, Figure 5 is an elevation of the rear half of the insulating casing, Figure 6 is an elevation of the regulating starter with a partial section, Figure 7 is a plan of the regulating starter, Figure 8 is a section through the regulating starter on the line A B of Figure 6, Figure 9 is a section through the regulating starter on the line C D of Figure 6, and Figure 10 is a cross-section through the motor and regulating starter in the case of a somewhat altered embodiment.

The drive together with the illuminating apparatus consist of the electromotor 1, the regulating starter 2 with operating lever 3, the apparatus plug 4, the plug socket 5 for the sewing lamp 6, as well as the carrying arm 7 for the casing 8 into which the aforesaid parts 1, 2, 4 and 5 are built and the sewing lamp 6 is inserted. The carrying arm 7 possesses, for the purpose of being fixed to the upper part of the machine, a bearing surface 9 and a slot 13 through which the screw 12, which usually serves for securing the hand apparatus, is passed in such a manner that the whole drive can be shifted vertically for the purpose of adjusting the tension of the belt. Between the two bearing eyes 10 for the operating lever 3 that are cast on the carrying arm 7 there is located the adjusting ring 14 with eye 15 and screw 16 which serves as an adjustable stop for limiting the number of stitches. The bent lever 17, which consists of a number of pieces of tubing that can be shifted within each other and which is used by the transmission mechanism 18 and 19 for regulating the speed of sewing, is constantly kept in the position of use by the spiral spring 11. When the machine is not in use, a backward rotation through approximately 45° enables the stopping pin 20 to be placed into the guide slot 21, so that the bent lever 17 can be brought into the opening 22 in the sleeve 18 and consequently into its position of rest. The sleeve 18 is provided with a cam 23 and is pivotally connected with a bell-crank lever 24, that is mounted on the frame 25 of the motor in the turning point 66, by means of a connecting rod 19, which is furnished with two screwable fork heads 26 and 27 for the purpose of exact adjustment.

On operating the bent lever 17 and consequently also the bell-crank lever 24, the automatic double-acting brake 65 is lifted by the vertically movable segment 28 which is carried in slots 29 of the brake 65 and at the same time contributes to the braking action. The spiral spring 30 serves for compensating for the difference of stroke between the bent lever 17 and the segment 28. The bell-crank lever 24 operates, through the nose-shaped extension 31, the carbon pressure regulating starter 2, which, as is known, enables a continuous regulation of the motor and consequently a sewing speed from embroidery stitching up to the maximum number of stitches to be obtained. In this way, an extensive regulation of resistance is obtained without any contacts being opened or closed. The rotary movement effected by the operation of the bent lever 17 is transmitted, through the transmission mechanism and through the bell-crank lever 24 with its nose-shaped extension 31, by means of an intermediate insulating piece 32 and the connecting springs 33, as a pressure to the carbon contacts 34 and 35 and to the actual packed carbon discs 36. The guide pin 37 is, owing to the recess 38 in the insulating cap 32, only operated when, on further increase of pressure, a further compression of the carbon discs and, consequently, a further alteration of resistance, is no longer possible. The spring 33 is now deflected to such an extent that the guide pin 37, which has in the meantime penetrated the recess 38 of the cap 32, is moved in the longitudinal direction of the body 39 and then operates the short-circuiting device 40. The regulating starter 2, which is housed in the heat-resisting insulating body 39, is enclosed by the two bottom casing halves 41 and 42 in such a manner that small carrying brackets 43, 44 and 45, which are placed all the way round or at intervals, provide a distance between the motor casing 8 and the body 39. In this way there is produced a circulation of air which is promoted by the openings 48 in the body 39, by the ventilating chambers arranged in the casing as well as by the ventilating slots 46 and 47 which are located on the two casing halves. Ordinary apparatus plug pins 5 and 51 are fixed by the angle pieces 52 and 53 on the casing 8 to the wall 49. The angle piece 52, which carries the apparatus plug pin 50, is brought into connection with the circuit of the motor by a metallic connection 54 which has a terminal screw 55 at its end. The angle piece 53, which carries the plug pin 51, is directly connected with the contact 56.

The plug socket 5 is fixed to the frame 25 of the built-in motor 1 by castings 57 and 57'. The connections are made by cables from the field coil 58 or the terminal screw 55. The plug bushes 59 may be arranged in horizontal arrangement instead of in vertical arrangement to each other or be pressed in or inserted between the halves of the casing. The sewing light 6, which is equipped with the switch 64, is, after being inserted in the plug bushes, stopped by a spring piston 60. The insulating casing 8, which consists of two parts, is screwed tight on to the built-in frame 25 of the motor. If, as shown in Figure 2, the front part of the casing 8 is removed, the whole interior can be inspected. In order to render possible the removal of one half of the casing 8 after loosening the screws for fixing the casing, there is provided a slot 62, through which the bolt 61 slides.

In the case of the embodiment shown in Figure 10, the regulating starter 101 is set with one of its narrow sides on the bottom of the electromotor 102 and the regulating starter and the motor are again surrounded by a common insulating casing. Inside this insulating casing there is also located the apparatus plug 105 that is fixed on a casting 104 on the motor.

At the bottom end of the insulating casing 103 there are provided ventilating openings 106 for the admission of the external air to the regulating starter 101, and, above the latter, there are provided in the wall of the casing openings 107 for the exit of the warm air.

108 denotes a mirror coating which is placed directly or indirectly on the bundle of stampings of the motor and which repels the rising heat to the lateral openings 107.

Finally, it is especially pointed out that, by means of the subject matter of the invention, it is possible to make an electrical drive for sewing machines which, apart from its advantageous construction and its great efficiency, is extremely economical as regards its manufacture.

What we claim and desire to secure by Letters Patent of the United States is:—

1. A self-contained, compact and insulated electrical drive unit for a household sewing machine, including the combination of a two part insulating casing interiorly subdivided into two chambers arranged one above the other, a built-in motor disposed in the upper chamber and having a frame which is transversely narrow and vertically greater than the transverse dimension while the motor is axially disposed longitudinally of the casing, a regulating starter disposed in the lower chamber with a long dimension thereof parallel with the length of said casing, plug in means in said casing for said motor disposed below the motor and adjacent to said regulating starter, a second plug in means in the casing approximately in line with an end portion of said motor for leading off current from said drive unit, and direct electrical connections within said casing between said first plug in means, motor, regulating starter and second plug in means eliminating lengthy and exposed external cables and similar connections therebetween and wholly protecting an operator from making accidental contact with said motor, starter, plug in means, or the electrical connections therebetween when the casing is closed.

2. A self-contained, compact and insulated electrical drive unit for a household sewing machine, including the combination of a two part casing of insulating material which is transversely shallow and has a line of cleavage practically disposed in the directions of the height and length of the casing so that one part of the casing is horizontally removable from the other, which casing is interiorly subdivided into two chambers arranged one above the other, a built in motor disposed in the upper chamber and having the shaft thereof practically disposed along the line of cleavage of the casing, a regulating starter disposed in the lower chamber with a long dimension thereof parallel with the length of said casing, plug in means in said casing for said motor disposed below the motor and adjacent to said regulating starter, a second plug in means in the casing along the line of cleavage and approximately in line with an end portion of said motor for leading off current from said drive unit, and direct electrical connections within said casing between said first plug in means, motor regulating starter and second plug in means eliminating lengthy and exposed external cables and similar connections therebetween and wholly protecting an operator from making accidental contact with said motor, starter, plug in means, or the electrical connections therebetween when the casing is closed.

3. A self-contained, compact and insulated electrical drive unit for a household sewing machine, including the combination of a two part casing of insulating material having a line of cleavage practically disposed in the directions of the height and length of the casing so that one part of the casing is horizontally removable from the other, and is further interiorly subdivided into two chambers arranged one above the other, a built-in motor disposed in the upper chamber and having the shaft thereof disposed practically along the line of cleavage of the casing, a regulating starter disposed in the lower chamber, plug in means in said casing for said motor disposed below the motor and adjacent to said regulating starter, a second plug in means in the casing along the line of cleavage and approximately in line with an end portion of said motor for leading off current from said drive unit, and direct electrical connections within said casing between said first plug in means, motor, regulating starter and second plug in means eliminating lengthy and exposed external cables and similar connections therebetween and wholly protecting an operator from making accidental contact with said motor, starter, plug in means, or the electrical connections therebetween when the casing is closed.

4. A self-contained, compact and insulated electrical drive unit for a household sewing machine, including the combination of a two part insulating casing interiorly subdivided into two chambers arranged one above the other, a built-in motor disposed in the upper chamber, a regulating starter disposed in the lower chamber, means in the casing supporting plug in means for the motor disposed below the latter, the casing having a generally vertical line of cleavage, a second plug in means in said casing beyond one end of said motor and disposed along the line of cleavage of the casing for leading off current from said drive unit, and direct electrical connections within said casing between said first plug in means, motor, regulating starter and second plug in means eliminating lengthy and exposed external cables and similar connections therebetween and wholly protecting an operator from making accidental contact with said motor, starter, plug in means, or the electrical connections therebetween when the casing is closed, one of the parts of said casing being horizontally separable along the line of cleavage from the other part while the other part retains within the same the motor, regulating starter, plug in means and electrical connections therebetween in wholly accessible condition.

5. A self-contained, compact and insulated electrical drive apparatus for a sewing machine, comprising the combination of a built-in motor, a regulating starter spaced below the same, plug in means beneath the motor for leading in the current, there being plug in means adjacent to one end of said motor for leading off current from said drive apparatus, direct electrical connections interconnecting the motor, regulating starter and plug in means, and means protecting said motor, starter, plug in means and concealing the electrical connections therebetween from accidental contact with the hands of an operator and eliminating exposed and lengthy connection cables between the parts of said apparatus, while also rendering the whole assembly of the apparatus readily accessible for inspection and repairs and uniting them into an interconnected cooperative unit, comprising a two-part insulating casing, of which one part is adapted to retain the motor, starter, plug in means and electrical connections therebetween in freely accessible position when the other part is removed.

6. A drive unit according to claim 4, wherein the second plug in means includes contact members secured directly to the end of the motor frame and practically in the line of cleavage of the casing.

7. A drive unit according to claim 5, wherein the casing is provided in both its parts intermediate the motor and the regulating starter with ventilating means so that the heat generated by the starter upon rising will pass out from the casing and avoid the motor above.

8. A drive unit according to claim 5, wherein the casing has both of its parts formed with ventilation openings in the sides thereof intermediate the motor and regulating starter so that the heat generated by the starter upon rising will pass out from the casing and avoid the motor above.

9. A drive unit according to claim 4, wherein the one part of the casing which is adapted to retain the motor and the electrical connections in position when the other part is removed, is provided with a downwardly extending projection directly supporting the first plug in means for the motor.

10. A drive unit according to claim 5, wherein means are interposed between the motor and regulating starter to deflect away from the motor the heat tending to rise from said regulating starter.

11. A drive unit according to claim 5, wherein a mirror is interposed between the motor and the regulating starter to reflect away from the motor the heat tending to rise from said regulating starter.

MAX SCHWAB.
HANS NEUFELD.